United States Patent
Repke

(10) Patent No.: US 6,356,536 B1
(45) Date of Patent: Mar. 12, 2002

(54) PROTECTIVE AND DECOUPLING SHUNT SWITCH AT LNA INPUT FOR TDMA/TDD TRANSCEIVERS

(75) Inventor: Joseph P. Repke, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/163,762

(22) Filed: Sep. 30, 1998

(51) Int. Cl.[7] .................................................. H04J 15/00
(52) U.S. Cl. ....................................................... 370/282
(58) Field of Search ................................. 370/282, 216, 370/229, 219, 311, 217, 227, 228, 218, 281, 278, 342, 347, 442, 276, 280, 287, 288, 294, 295, 321, 344, 337; 340/825.5, 825.01, 825.03, 827; 379/221

(56) References Cited

U.S. PATENT DOCUMENTS 5,038,406 A  *  8/1991  Titterton et al. ............ 359/113

* cited by examiner

Primary Examiner—Dang Ton
(74) Attorney, Agent, or Firm—Coats & Bennett, PLLC.

(57) ABSTRACT

The invention relates to an improved front-end circuitry for a radio transceiver for which the receiver and transmitter share a common transmission path, which is switched between the receiver and transmitter during operation. An additional switch is placed between the RF switch and the receiver circuitry, and, preferably, in close proximity to the receiver circuitry. The switch is configured to provide a low impedance electrical path to ground for the receiver circuitry input during transmission sequences and an open circuit during receiving sequences. Coupling the receiver input to ground during transmission sequences at a location proximate to the receiver input significantly reduces the amplitude of all unwanted signals appearing at the receiver's input during transmission sequences, especially attenuated and/or delayed replicas of the transmitted signal itself. These signals can result in distortion of the transmitted signal due to feedback into the transmitter chain, and/or damage to the sensitive electronics of the receiver.

34 Claims, 8 Drawing Sheets

PROTECTIVE AND DECOUPLING SHUNT SWITCH AT LNA INPUT FOR TDMA/TDD TRANSCEIVERS

FIELD OF THE INVENTION

The present invention relates generally to an improved front-end circuit for a radio transceiver, and more particularly to a front end circuit for a radio transceiver that has a common signal path for both the transmitted and received signals.

BACKGROUND OF THE INVENTION

For clarity, the following specification and claims assume that a wireless communication mobile terminal includes wireless radio transceivers, such as personal communication assistance, pagers, analog and digital cellular telephones and the like, which are configured to operate in wireless communication systems where mobile terminals communicate via terrestrial and satellite base stations to any number of telephony systems.

Time Division Multiple Access (TDMA) is a time-based method for sharing communication resources in a mobile communications system. In a TDMA system, each communication channel is divided into periodic "frames" with each frame subdivided into several equal duration time "slots". Each mobile station is assigned a slot in the frame during which the mobile station transmits and receives information in short bursts. In a TDMA system, any given time slot may be used for transmissions in both directions—mobile station—to—base station and base station—to—mobile station. Since there are several slots per frame, a plurality of mobile users can simultaneously use each communication channel. The assignments of timeslots is coordinated by a centrally-located "master", which, in a in traditional wireless system, is a base station. One of the primary benefits of using a Time-Division Multiple Access (TDMA) is to allow multiple users to time-share a limited radio frequency spectrum.

Time-Division Duplex (TDD) is a variation of the TDMA concept. In a TDD system, specific slots in time are designated for only portables to transmit and base stations to receive (and vice versa). With the hardware operating under these constraints, radio hardware designers are often able to share radio circuitry common to both transmitter and receiver, since signals are only present in either the receive or the transmit direction at any one time. This provides benefits of reduction of circuitry, resulting in reduced cost, smaller size and reduced complexity.

Included in the circuitry shared between receiver and transmitter is the antenna and radio frequency (RF) signal filtering. These items perform similar functions in the receive and transmit modes, but at vastly different signal levels. The receiver is designed for detecting and processing extremely small signals (on the order of pico Watts ($10^{-12}$ Watts)), and for that, semiconductor devices with great sensitivity are required. The transmitter, however, is producing power levels typically twelve or more orders of magnitude greater than that—typically 1 Watt. The large signals can damage the much more sensitive receiver circuitry, if the receiver is not protected, or isolated in some way. Thus, some sort of a switching function is needed for such a system.

A variety of solutions have been used over the years in which receiver and transmitters have shared antenna and filtering subsystems. Passive RF power combiners, for example, are designed such that the signal can be routed to each path at the same time, while maintaining isolation between transmitter and receiver. However, in general, they are not a good solution for this problem, as half the power goes to each path all the time. Since each circuit in a TDMA or TDD system is only used half the time that the radio is active, this is very inefficient. RF circulators, comprised of ferrite devices which pass signals in one direction with low loss, but in the opposite with high loss are another option. Until only recently such systems were not suitable for use in mobile radio transceivers because their size, weight and cost were prohibitive. Also, RF circulators might not by themselves provide sufficient performance.

Consequently, a transmit/receive (T/R) RF switch is most often present near the antenna of the radio for TDMA and TDD systems. This T/R switch is generally a single-pole-double-throw (SPDT) switch, but depending upon the presence and extent of antenna and/or other diversity devices, more poles and "throws" may be present.

A block schematic of a mobile communications device is shown in FIG. 1. These systems generally include a transmitter 10 and receiver 12 alternately switched onto a common signal path 14 by an RF T/R switch 16. The common signal path 14 leads to an antenna 18 and preferably includes a filter 20, which is generally a bandpass filter (BPF). The transmitter 10 will usually include a power amplifier 22 while the receiver 12 will usually include a low-noise amplifier (LNA) 24.

The RF switches in the earliest days of radio were electromechanical relay switches, which were slow to settle between states and suffered from early fatigue, since they were generally limited to less than 1 million operations. As semiconductors improved in technology, bandwidth, and cost, they became a much more attractive solution. Currently, with the speed and reliability required for modern systems (PWT/DECT switches at least 200 times per second during a normal phone call), solid-state (semiconductor) switches are necessary.

Several topologies of RF switch designs using "PiN" diodes as the switching elements are commonly used. These diodes exhibit a distinct feature that when forward-biased, they appear as a short circuit to radio frequencies, and when not biased (or reverse-biased) appear as a very high impedance to RF. In RF switches, PiN diodes are alternately biased on and off to produce short and open circuits, respectively, in different arrangements to form SPST, SPDT and DPDT RF switches.

FIG. 2(a) shows one of the more commonly-used topologies for the RF switch 16, the series-shunt configuration. This configuration generally includes a series PiN diode 26 and a shunt PiN diode 28. Both diodes are biased on simultaneously during the transmit mode through an inductor 30 by a control signal, such as $V_{Bias}$. The block diagrams in FIG. 2(b) shows the effective functionality of this circuit. Note that although the shunt diode 28 is biased ON, and thus low resistance, its appearance to the antenna in the transmit mode is that of an open circuit, due to the impedance transformation occurring via the quarter-wavelength ($\lambda/4$) transmission line 32. The transmission line length may be actual or effective based on inductance and capacitance affecting or added to the signal path.

Great strides have also been made in recent years to bring the cost of Gallium Arsenide (GaAs) components to a level more competitive with silicon and thus GaAsFET (GaAs field effect transistor) RF switch solutions have become another widely used solution, generally in the form of a Monolithic Microwave Integrated Circuit (MMIC). The MESFET's are also biased on or off to produce either low or very high resistances to radio frequency signals. The most common circuit topology used is a "branched" T-pad configuration shown in FIG. 3(a), where in the "ON" arm of the switch, the series FETs 40, 42 are ON (low resistance) and the shunt (to-ground) FET 44 is OFF (high-impedance). In contrast, the OFF arm of the switch has the two series FETs 46, 48 presenting a high series impedance to signal, while also shorting the signal to ground with the shunt FET 50 between the two series devices 46, 48. FIG. 3(b) shows the effective operation of the circuit in a transmit mode. The switch positions are reversed during the receiving operation.

Most of the RF switches are designed and specified to operate in a 50-Ohm environment, which has become the most common standard, due to the ease of implementing passive and active circuits at practically any radio frequency at this impedance. The loss of signal through the intended signal paths (antenna to receiver and transmitter to antenna), called insertion loss, is a parameter of importance for these devices. But without adequate reduction of signal level between receiver and transmitter (called signal isolation), the low-noise amplifier (LNA) in the receiver front-end can be permanently damaged by the radio's own transmitted signal. For example, damage levels for such devices typically occur at a level as low as +10 dBm, which would require a 1-watt transmitter (+30 dBm) to be isolated by at least 20 dB.

With the transmitter 10 connected to one of the switch branches and the receiver connected to the other, a non-ideal switch will permit a finite amount of signal to leak between these parts of the radio. Of most concern is signal leakage during transmit mode. The transmitter's relatively high power signal, which is typically on the order of 100 mW to in excess of 1 Watt, may cause damage to or degrade the performance of the receiver's LNA 24 when leakage occurs.

Even if not sizable enough to cause damage, a leakage signal from the transmitter 10 could still be sufficient enough in magnitude to find its way through shared circuitry, especially via local oscillator signals shared between transmitter upconverter(s) and receiver downconverter(s). This phenomenon is essentially feedback into the transmitter "loop" and can result in transmitter instability, such as oscillation, and other signal distortion when the leakage signal at the same frequency is reamplified and combined at varying phase angles and/or delays (determined by the exact coupling path-length) with the desired transmitted signal.

The transmitter "feedback" problem described above can become more prevalent when the LNA 24 is powered down in the transmit mode, normally resulting in a high impedance state at its input. This allows a larger voltage swing on the LNA input pin than when terminating the signal in the "normal" 50-Ohms when the LNA is powered on, thus resulting in signal isolation that is lower than expected. Typically, the isolation commonly achievable for the GaAs MMIC switches described above can have values as little as 12 dB, with more superior devices yielding 20 to 30 or more dB of isolation. However, with a high-impedance load, the high-impedance series FET on the LNA side does not drop the signal's voltage amplitude as much as it would with a low-impedance load (i.e., 50 Ohms), thus producing less than the specified isolation.

Amplifying the situation even further is the increasingly common use of a single transceiver Application-Specific Integrated Circuit (ASIC), where the LNA 24, a transmitter amplifier preceding the power amplifier 22, and RF up- and downconverters share the same small silicon die and package. This presents great concern, as these circuits are physically located within millimeters (or less) of one another, with bondwires running potentially parallel to each other, resulting in significant amounts of inductive coupling, a situation not present in other embodiments. The leakage signal may produce a significant voltage swing that can be picked up by other active circuits within the package. Again, since the leakage signal often arrives via a path with significantly varying phase over frequency, it can combine with the desired signal in-phase and out-of-phase, resulting in constructive and destructive amplitude response, which can be seen across the transmitter's passband.

SUMMARY OF THE INVENTION

The present invention provides an effective and economical solution for the problems described above. The invention relates to an improved front-end circuitry for a mobile terminal for which the receiver and transmitter share a common transmission path, which is switched between the receiver and transmitter during operation via an RF Transmit/Receive (T/R) switch. An additional shunt switch is placed between the T/R switch and the receiver circuitry, and, preferably, in close proximity to the receiver circuitry. The shunt switch is configured to provide a low impedance electrical path to ground for the receiver circuitry input during transmission sequences and an open circuit during receive sequences. Coupling the receiver input to ground during transmission sequences at a location proximate to the receiver input significantly minimizes the amplitude of all unwanted signals appearing at the receiver's input during transmission sequences, especially attenuated and/or delayed replicas of the transmit signal itself. These signals can result in distortion of the transmitted signal due to feedback into the transmitter chain and/or damage to the sensitive electronics of the receiver.

Accordingly, the present invention relates to a transceiver, such as a mobile radio transceiver, and particularly to front-end circuitry coupled between an antenna and a receiver and transmitter. The front-end circuitry includes a common signal path between an RF Transmit/Receive (T/R) switch and the antenna wherein the T/R switch has a first state coupling the transmitter to the common signal path and a second state coupling the receiver to the common signal path via a receive signal path. A shunt switch is provided between the receive signal path and ground wherein the receive signal path is coupled to ground during transmission sequences to minimize the amplitude of all unwanted signals appearing at the receiver's input during transmission sequences, especially attenuated and/or delayed replicas of the transmitted signal itself. These signals can result in distortion of the transmitted signal due to feedback into the transmitter chain and/or damage to the sensitive electronics of the receiver. The shunt switch is preferably any type of solid state switching circuitry, including various types of transistors or diodes arranged alone or in combination to function as a switch based on a control signal corresponding to transmission and receive sequences. Preferably, the shunt switch is placed at an electrical distance less than an equivalent one-eighth wavelength of the carrier frequency along the transmission line from the receiver input, which is typically a low-noise amplifier. Although this preferred placement is not required, attenuation of the stray signals increases as the distance between the shunt switch and receiver input decreases. It is also preferable to place the shunt switch at an electrical distance of approximately one-quarter wavelength of the carrier frequency from the T/R switch.

The present invention is ideal for Time-Division Multiple Access (TDMA) and Time-Division Duplex (TDD) radio communications systems. The invention consists of electronics located within the front-end circuitry of a radio transceiver, the implementation of which can be comprised of discrete circuitry and/or integrated circuit (IC) technology.

These and other aspects of the present invention will become apparent to those skilled in the art after reading the following description of the preferred embodiments when considered with the drawings.

BRIEF DESCRIPTION OF THE DRAWING FIGURES

DETAILED DESCRIPTION OF THE PREFERRED EMBODIMENTS

Figure 1:
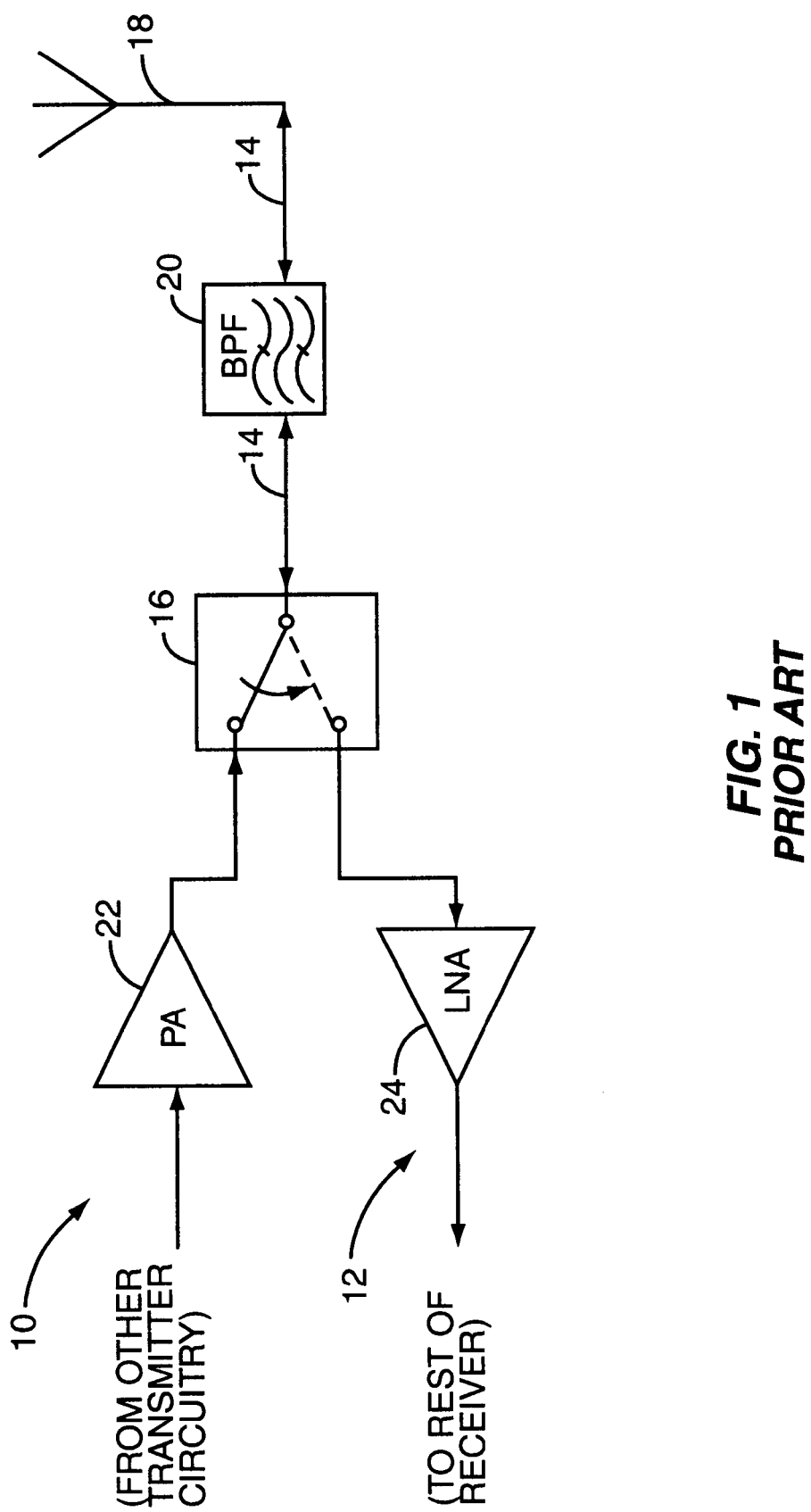
FIG. 1 is a block schematic of a generalized radio transceiver front-end of the prior art.

In the following description, like reference characters designate like or corresponding parts throughout the several figures. It should be understood that the illustrations are for the purpose of describing preferred embodiments of the invention and are not intended to limit the invention thereto.

Figure 4:
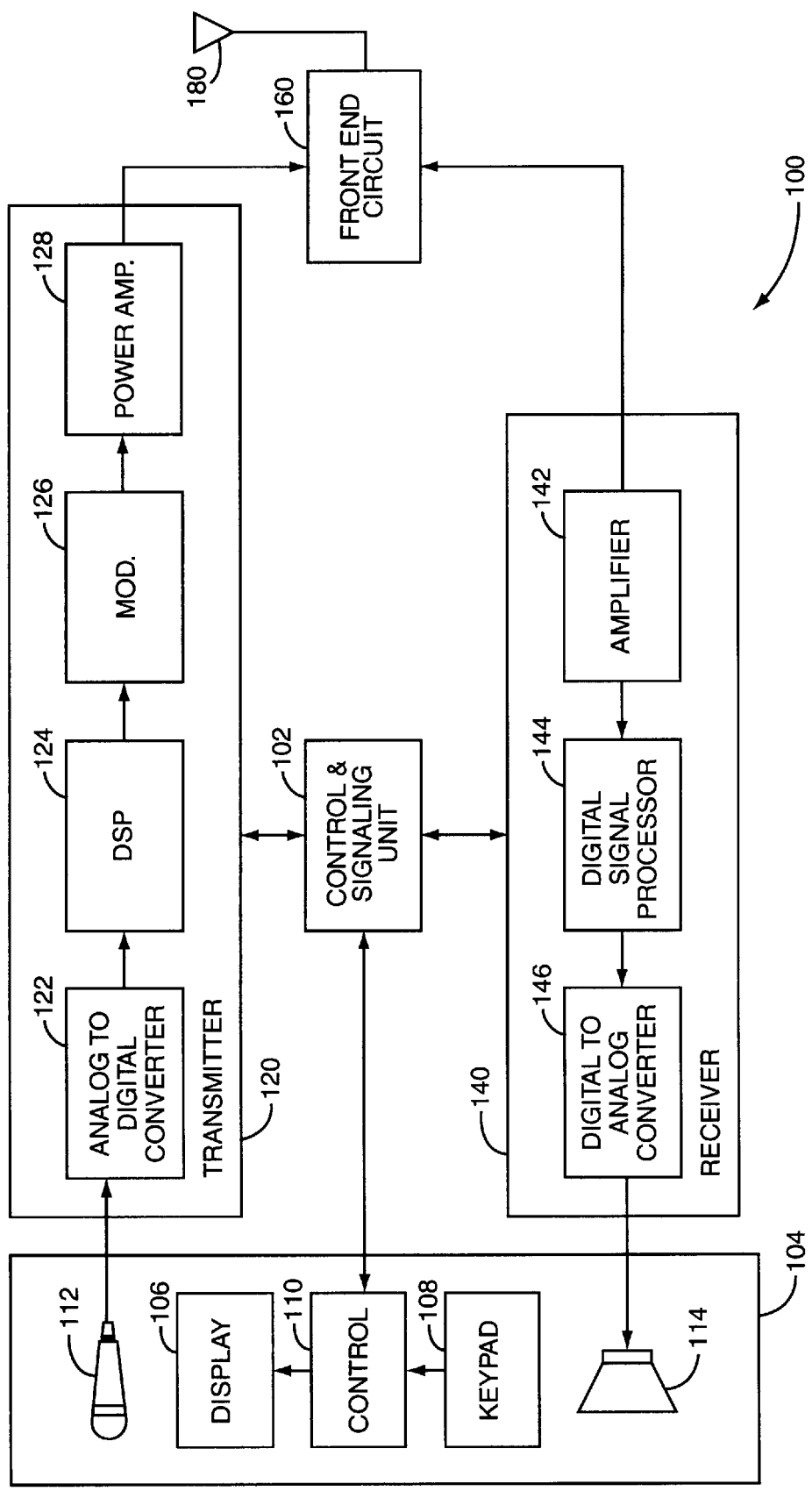
FIG. 4 is a block diagram of a mobile radio transceiver front-end constructed according to the present invention.

FIG. 4 is a block diagram of a typical mobile radio transceiver 100 of the present invention incorporating the present invention. It is to be understood that the present invention is not limited in its application to mobile radio transceivers, but may be used in transceivers of all types. The mobile radio transceiver 100 shown in FIG. 4 is a fully functional radio transceiver capable of transmitting and receiving digital signals. Those skilled in the art will recognize, however, that the present invention may be implemented in an analog transceiver. The mobile radio transceiver 100 includes an control and signaling unit 102, an operator interface 104, a transmitter 120, the receiver 140, a front end circuit 160, and an antenna 180.

The operator interface 104 includes a display 106, keypad 108, control unit 110 microphone 112, and speaker 114. The display 106 allows the operator to see dialed digits and call status information. The keypad 108 allows the operator to dial numbers, enter commands, and select options. The control unit 110 interfaces the display 106 and keypad 108 with the control and signaling unit 102. The microphone 112 receives audio signals from the user and converts the audio signals to analog signals. Speaker 114 converts analog signals from the receiver 140 to audio signals that can be heard by the user.

The analog signals from the microphone 112 are applied to the transmitter 120. The transmitter 120 includes an analog to digital converter 122, a digital signal processor 124, a modulator 126, and a power amplifier 128. The analog to digital converter 122 changes the analog signals from the microphone 112 into a digital signal. The digital signal is passed to the digital signal processor (DSP) 124. The digital signal processor 124 compresses the digital signal and inserts error detection, error correction and signaling information. The compressed and encoded signal from the digital signal processor 124 is passed to the modulator 126. The modulator 126 converts the signal to a form that is suitable for transmission on a RF carrier. The power amplifier 128 then boosts the output of the modulator for transmission.

The receiver 140 includes a low noise amplifier 142, a received signal processor 144, and a digital to analog converter 146. Received signals are passed to the low noise amplifier 142 which boosts the low-level RF digital signal to a level appropriate for input to the digital signal processor 144. The digital signal processor 144 includes a demodulator and channel decoder. The demodulator extracts the transmitted bit sequence from the received signal. The channel decoder detects and corrects channel errors in the received signal. The channel decoder also separates control and signaling data from speech data. The digital signal processor may also include an equalizer to compensate for phase and amplitude distortion of the transmitted signal. The control and signaling data is passed to the control and signaling unit 102. Speech data is processed by a speech decoder and passed to the digital to analog converter 146. The digital to analog converter 146 converts the speech data into an analog signal which is applied to the speaker 114 to generate audible signals which can be heard by the user.

The front end circuit couples the transmitter 120 and the receiver 140 to the antenna 180. The antenna 180 is used for both transmission and reception. One function of the front end circuit 160 is to isolate the receiver 140 from the transmitter 120, particularly during transmit sequences.

The control and signaling unit 102 functions coordinates the operation of the transmitter 120 and the receiver 140. These functions include power control, channel selection, timing, as well as a host of other functions. The control and signaling unit 102 inserts signaling messages into the transmitted signals and extracts signaling messages from the received signals. In a mobile radio transceiver, the control and signaling unit 102 responds to any base station commands contained in the signaling messages, and implements those commands. When the user enters commands via the keypad 30, the commands are transferred to the control and signaling unit 102 for action.

Figure 5:
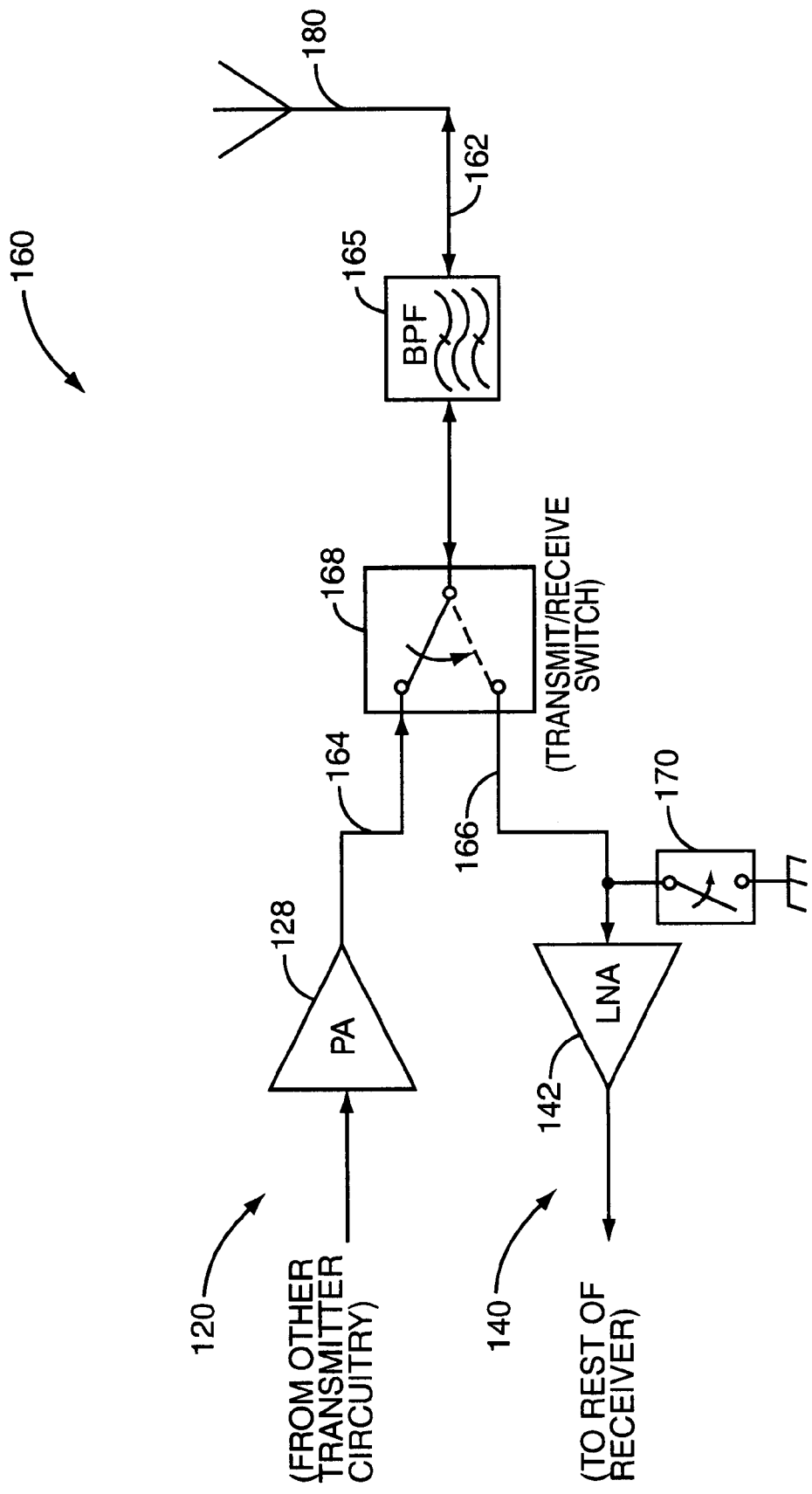
FIG. 5 is a simplified schematic diagram of a radio transceiver front-end constructed according to the present invention.

FIG. 5 is a block diagram of the front end circuit 160 of the present invention. The front end circuit 160 may be used in a TDMA or TDD transceiver. The front end circuit 160 includes a common signal path 162 including a band pass filter 165 connecting the transmitter 120 and receiver 140 to the antenna 180. The front end circuit 160 includes a transmit signal path 164 connected to the power amplifier 128 of the transmitter 120 and a receive signal path 166 connected to the low noise amplifier 142 of the receiver 140.

A transmit/receive (T/R) switch 168 alternately connects the transmitter 120 and receiver 140 to the common antenna 180. A shunt switch 170 is located along the receive signal path 166 between the transmit/receive (T/R) switch 168 and the receiver 140. Preferably, the shunt switch 170 is proximate, and preferably as close as possible, to the LNA input of the receiver 140. One side of shunt switch 170 is connected to the receive signal path 166 near the LNA input of the receiver 140 and the other side is connected to ground. Preferably, the shunt switch 170 is a single-pole-single-throw (SPST) switch. However, those skilled in the art will recognize that it is possible to make variations of the present invention which use a single-pole, double throw (SPDT) switch.

The shunt switch 170 remains open during the receive mode of operation, where it appears nearly electrically invisible to the received signal as an open circuit. Alternately, the switch is closed during the transmit mode, essentially shorting to ground any signal leaking into the receive signal path 164 through the T/R switch 168. As this presents a low impedance to ground to the leaked RF signal, a voltage minimum appears at the high-impedance LNA input, thus minimizing the power of unwanted signal available within the LNA circuit and/or for electromagnetic coupling to other pins of the transceiver ASIC. The use of this shunt switch 170 is most effective when used in combination with a conventional RF T/R switch 168, i.e., GaAsFET MMIC, series PiN, etc. When used in conjunction with a series-shunt T/R switch 168 that inherently contains a shunt PiN (or other shorting device to ground), the invention benefits from the isolation performance most when separated from the shunt device of the T/R switch by an electrical length of approximately one-quarter (¼) the wavelength of the RF carrier.

Several potential embodiments of the invention exist. The shunt switch 170 can be comprised of discrete circuitry, i.e., a shunt PiN diode, or a RF transistor, which can be biased into saturation (switching mode) during transmission. Alternatively, the switch 170 could be implemented within a receiver or transceiver ASIC, on-chip, whereby a transistor or diode switch configuration can shunt the signal to ground during the transmit mode of operation.

Figure 2A:
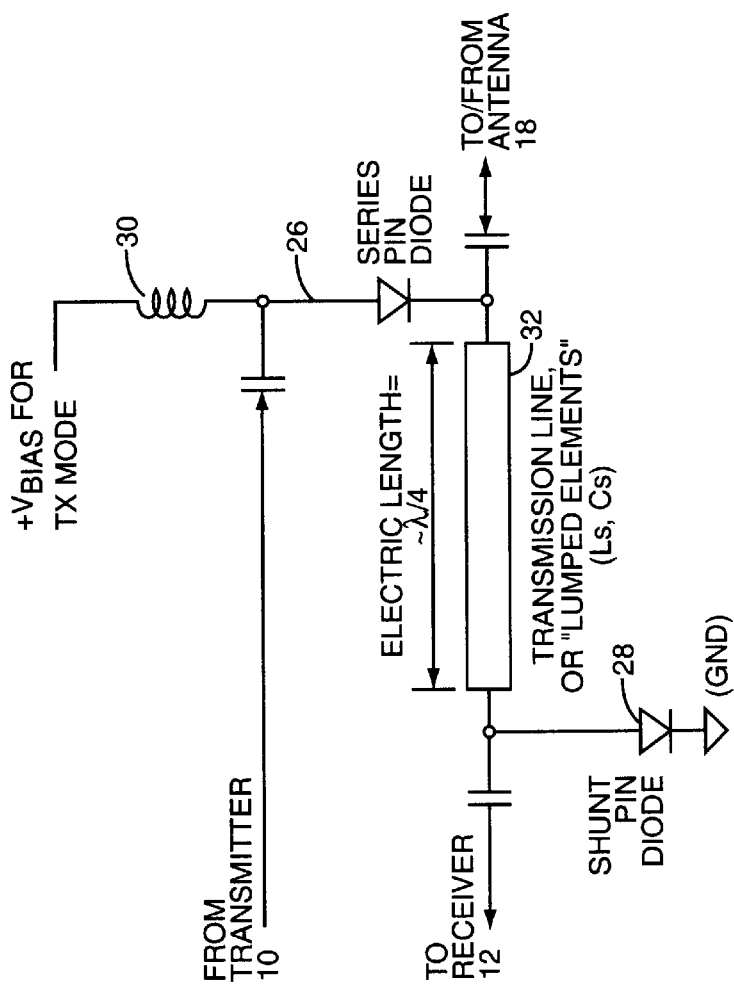
FIG. 2(a) is a schematic diagram showing a prior art RF switch using a PiN diode series-shunt switch configuration.
Figure 2B:
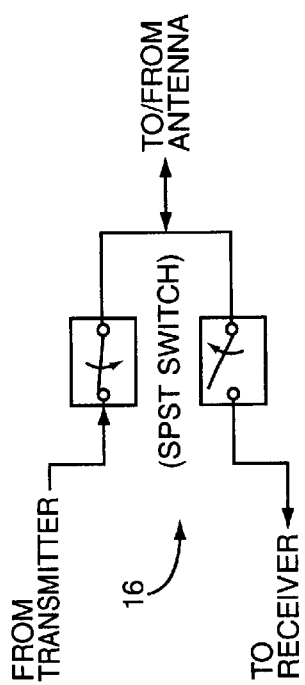
FIG. 2(b) is a functionally equivalent schematic diagram of the RF switch shown in FIG. 2(a) during transmission mode.
Figure 3A:
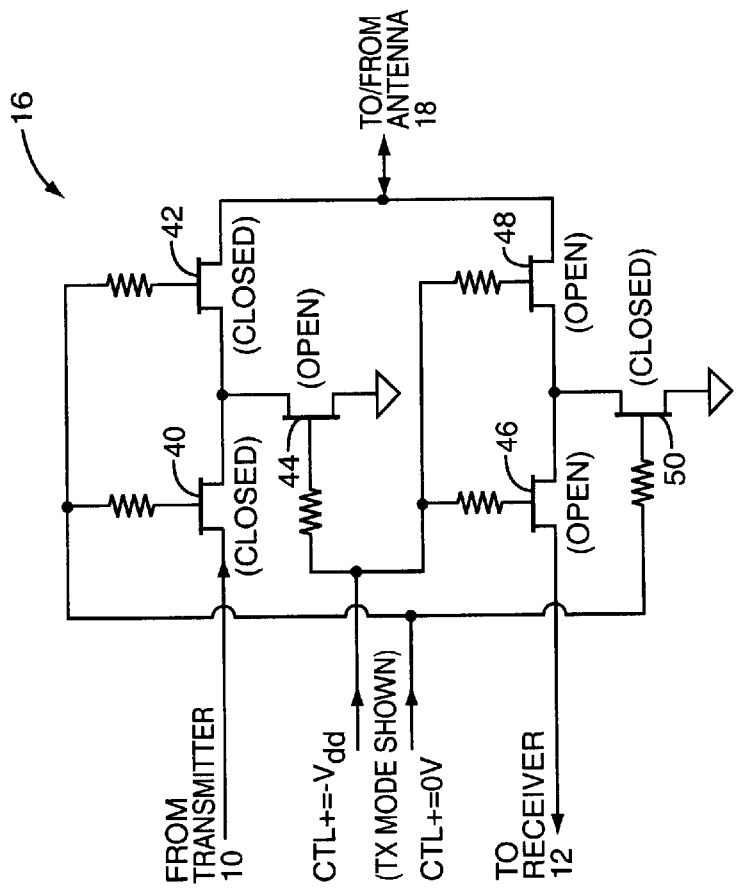
FIG. 3(a) is a schematic of a prior art RF switch using a GaAs MES FET configuration of the prior art.
Figure 3B:
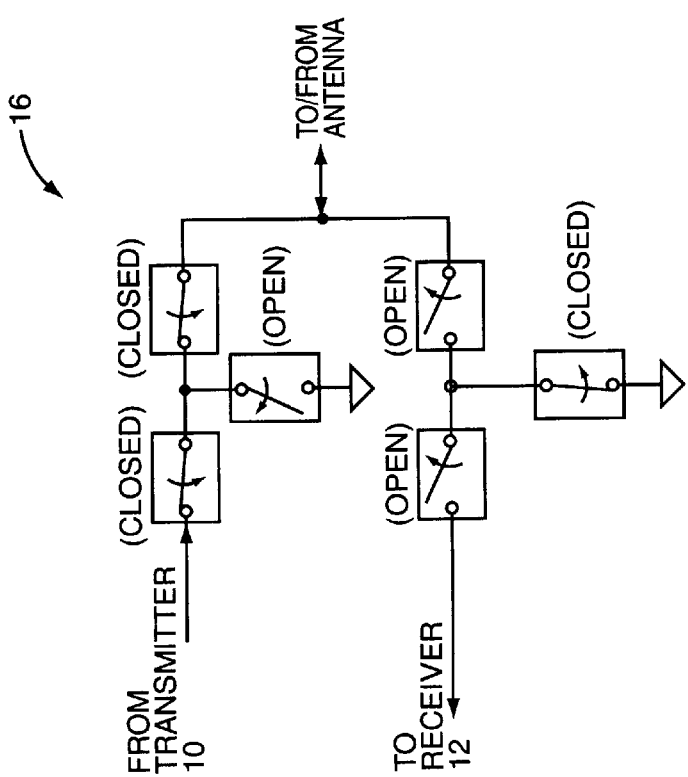
FIG. 3(b) is a functionally equivalent schematic diagram of the RF switch configuration shown in FIG. 3(a) during transmission mode.

As noted, effectiveness of shunt switch 170 increases as placement approaches the low-noise amplifier input. A series-shunt PiN diode T/R switch as shown in FIG. 2 does contain a path to ground, the primary function of which is to create a standing wave at RF frequencies such that an open circuit is presented at the junction to the opposing branch of the T/R switch. This shunt PiN diode is intentionally located an electrical length of approximately λ/4 from the junction of the three paths, where λ is the wavelength of the RF carrier. When the diode is biased on, nearly all the signal transmitted down the opposing branch is reflected away from the open circuit presented at this junction, and nearly all RF power travels along the common branch of the switch and common signal path 14 to the antenna 180.

As is often the case, the shunt diode 28 of the series-shunt T/R switch may be placed towards the receiver input, but primarily for other reasons. The main reason is that oftentimes wireless devices operate in a receive mode for a higher percentage of the time than in the transmit mode, and thus to prolong battery life in portable devices, the current consumption in the receive mode is minimized as much as possible. Since the diodes are ON when biased, the diodes should therefore be unbiased (or reverse-biased) during the receive mode, and biased ON during the transmit mode. In the transmit mode, a few milliamperes compared to the power amplifiers hundreds of milliamperes (peak) is not nearly as significant as to the receiver's typically much lower power consumption, and especially due to the typically shorter duty cycle of the transmitter.

Another reason the shunt diode 28 is often found on the receive side is that the series-diode branch of the series-shunt T/R switch typically has a few tenths dB more insertion loss than the shunt diode side, which would directly degrade receiver sensitivity. The most effective way to decrease loss in the series diode is to increase the diode's bias current, but again, this was undesirable, as explained above. However, previously existing techniques do not necessarily place an additional shunt proximate to the LNA input for minimizing the voltage swing into the LNA input during transmission.

IMPLEMENTATION EXAMPLES

Figure 6:
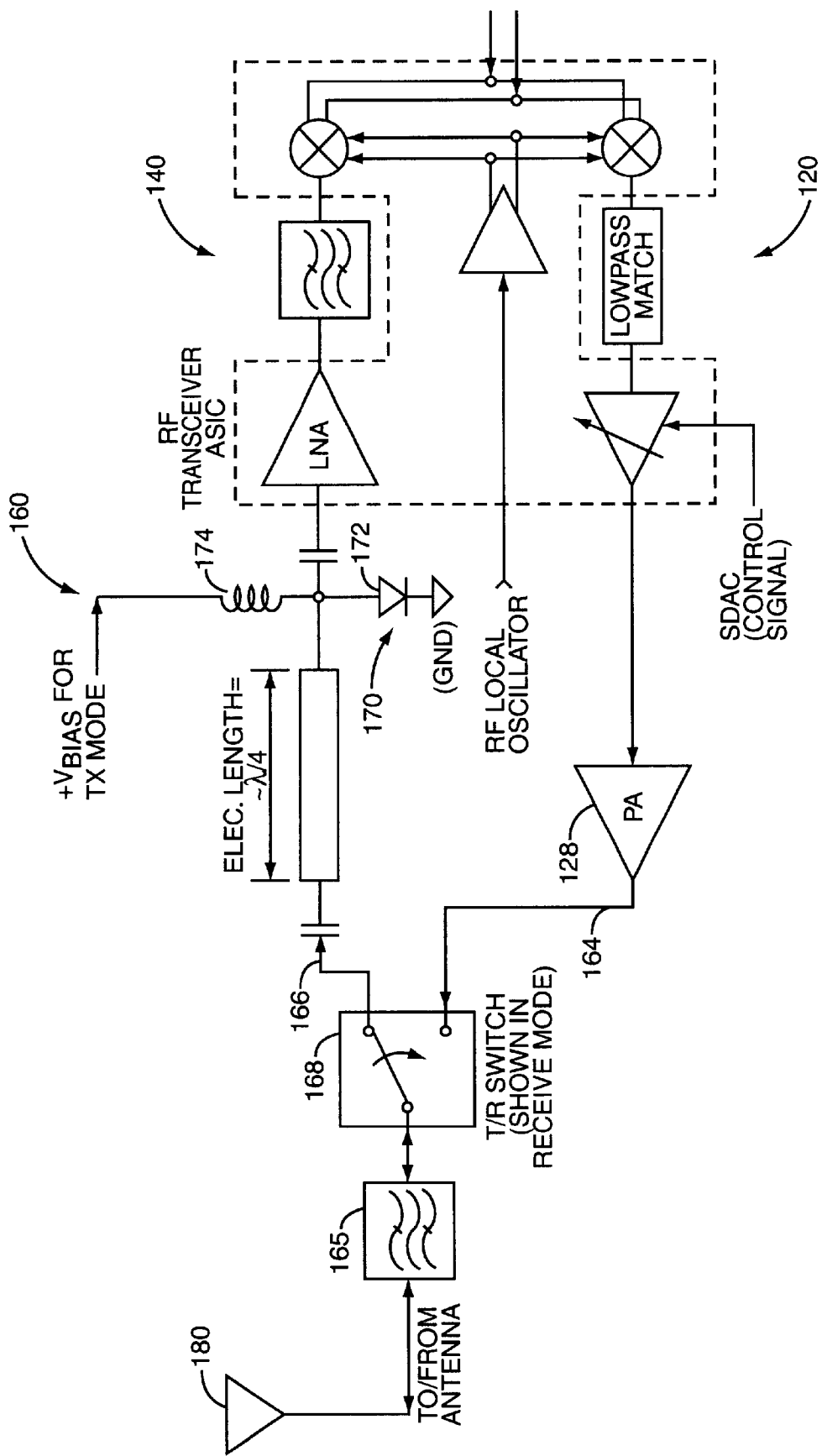
FIG. 6 is a first exemplary embodiment of a radio transceiver front-end constructed according to the present invention.

One embodiment of the present invention is shown in FIG. 6 and uses a single RF PiN diode 172, oriented in a shunt configuration with the LNA's input pin. The PiN diode 172 is forward-biased during a radio's transmit mode of operation through inductor 174 by a control signal $V_{BIAS}$. As noted above, the shunt switch 170 is preferably located approximately one-quarter wavelength (physically or electrically) of the RF carrier from T/R switch 168. The shunt switch 170 should be placed as close as possible to the receiver circuitry input. The shunt switch 170 is preferably less than about one-eighth the carrier frequency wavelength from the receiver circuitry, LNA input. FIG. 6 shows one example of a discrete circuit implementation for the invention.

Figure 7:
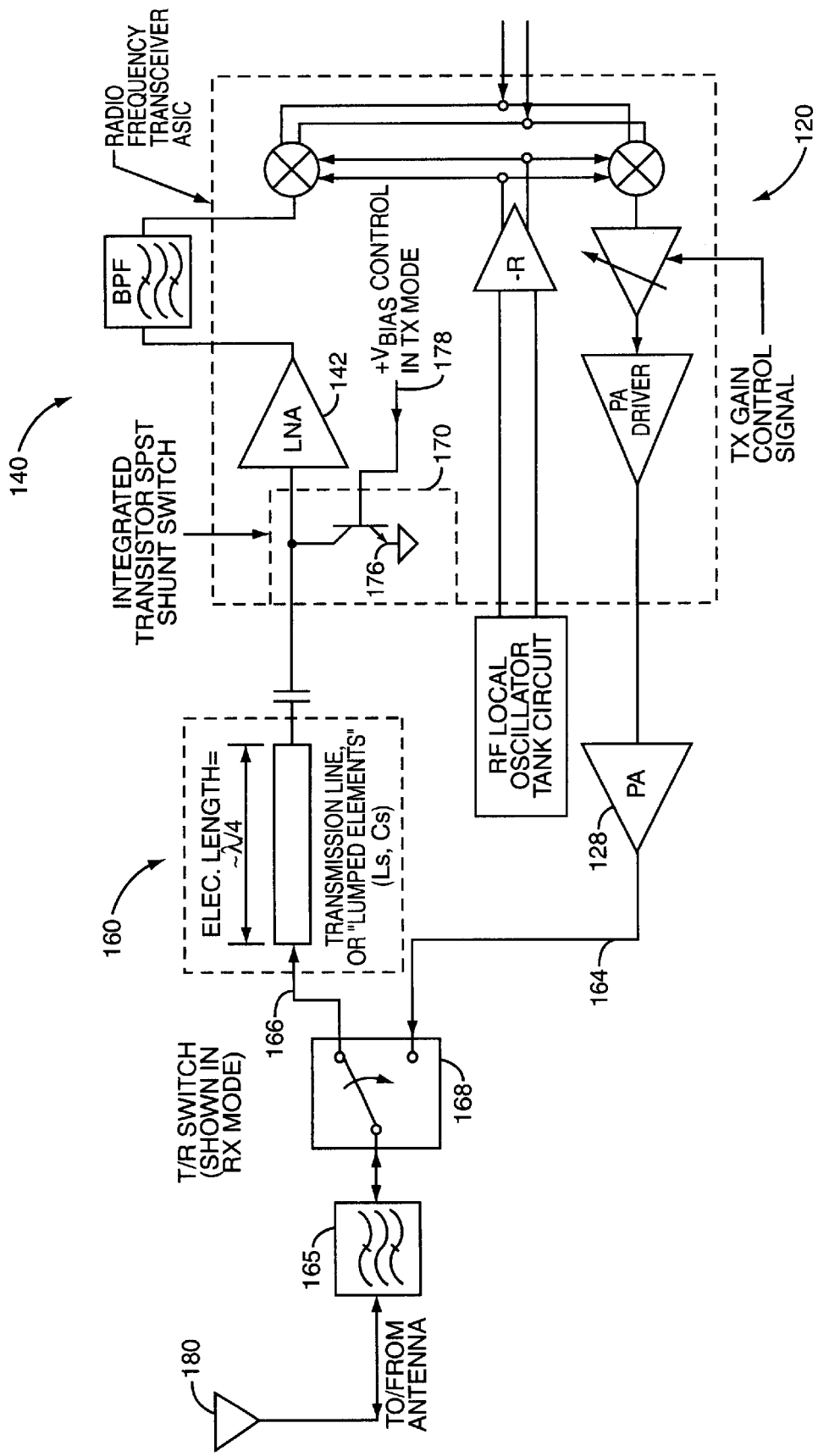
FIG. 7 is a second exemplary embodiment of a radio transceiver front-end constructed according to the present invention.

A second embodiment is shown in FIG. 7 wherein shunt switch 170 is a transistor switch 176 located at the input of the low-noise amplifier 142 and within an integrated circuit radio transceiver. The transistor's base is biased on by a control signal 178 while the transmitter 120 is powered on, causing the input transistor 176 to saturate and effectively short circuit any signal on the LNA input of the receiver 120 to ground.

Figure 8:
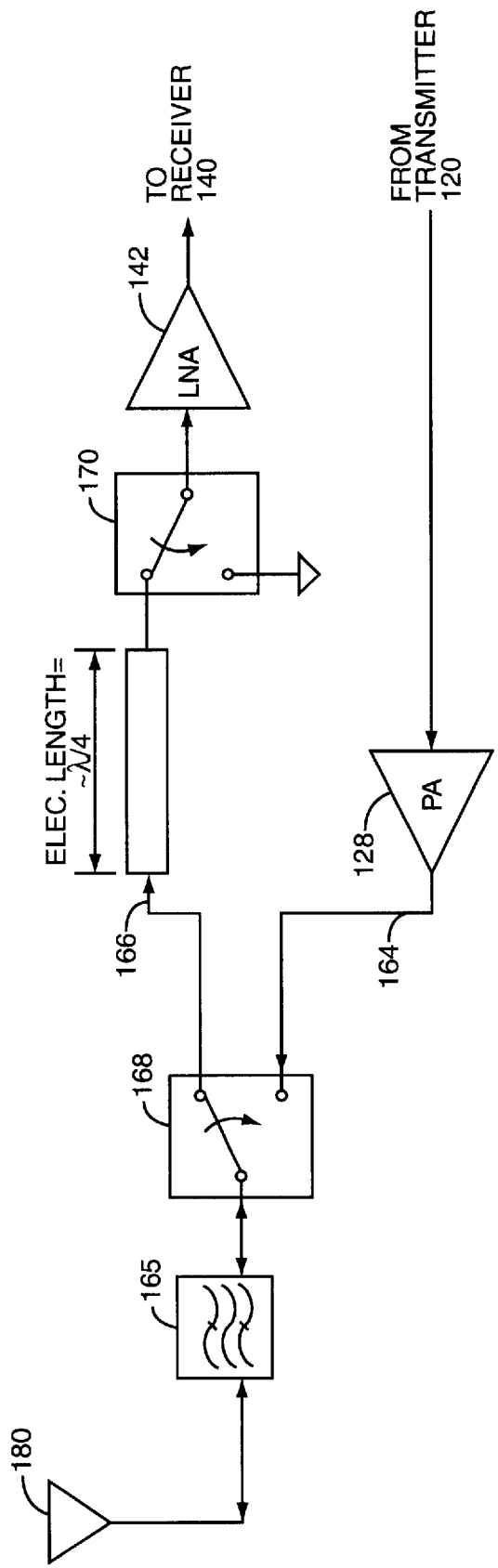
FIG. 8 is a third exemplary embodiment of a radio transceiver front end constructed in accordance with the present invention.

FIG. 8 shows a third embodiment of the shunt switch 170. In this embodiment, the shunt switch 170 is a SPDT switch. In receive mode, the switch connects the receiver side of the T/R switch to the LNA input of the receiver. In transmit mode, the shunt switch 170 connects the LNA input to ground, and breaks the connection between the LNA and the receiver side of the T/R switch.

The embodiments of FIGS. 6 and 7 disclose the invention implemented using discrete components as well as being integrated within an integrated circuit. It should be noted that transistor switching configurations may be used in embodiments using discrete components and diode switching configurations may be implemented within the integrated circuit. Furthermore, the integrated circuits of either embodiment may include any number of receiver and transmitter components and electronics. These application-specific integrated circuits (ASIC) shown in FIGS. 5 and 6 include or are coupled with local oscillators, double-balanced mixers, amplifiers, and filters. Those of ordinary skill in the art will recognize numerous techniques to implement receiver, transmitter, and/or transceiver circuitry.

Those skilled in the art will also recognize the numerous options available to a designer to provide control of shunt switch 170. The control may come directly from control or other processing means in the transceiver 100 or be derived therefrom. Typically, a transmit control signal is generated somewhere within the terminal to control the transmitter electronics and T/R switch 168. Such signals are preferably used to directly or indirectly control the shunt switch 170 so that the input of the receiver circuitry is tied to ground during any transmission sequence and open during a receiving sequence. It is preferable that the switch appear as an open circuit during the receive mode, in order not to attenuate or otherwise distort the received signal.

Transmission line lengths and distances may include physical distance as well as effective electrical distance wherein a select physical distance may be modeled or simulated by various combinations of inductance and capacitance added to a transmission path. As such, the specification claims should be read and interpreted accordingly. Furthermore, although the preferred embodiments' focus is on time division multiple access (TDMA) communication systems incorporating time-division duplex (TDD) techniques, the present invention is beneficial for any radio transceiver having a common transmission path used to alternate between transmitting information and receiving information.

Certain modifications and improvements will occur to those skilled in the art upon reading the foregoing description. It should be understood that all such modifications and improvements have been omitted for the sake of conciseness and readability, but are properly within the scope of the following claims.

I claim:

1. A front-end circuit for a radio transceiver having a receiver, a transmitter and an antenna, said front-end circuitry comprising:
   a. a common signal path connected to said antenna and shared by the transmitter and receiver of the radio transceiver;
   b. an RF Transmit/Receive (T/R) switch for alternately coupling the transmitter and receiver to the common signal path, said T/R switch having a first state coupling the transmitter to the common signal path and a second state coupling the receiver to the common signal path via a receive signal path; and
   c. a shunt switch connected between said receive signal path and an electronic ground, said shunt switch distinct from said T/R switch and disposed downstream on said receive signal path from said T/R switch, said shunt switch having a first shunt state coupling said receive signal path to ground and a second shunt state not coupling said receive signal path to ground, wherein said shunt switch is placed in said first shunt state during transmission and in said second shunt state during reception.

2. The front-end circuit of claim 1 wherein said shunt switch is an electronic solid state shunt switch.

3. The front-end circuit of claim 2 wherein said shunt switch comprises at least one diode being forward biased for coupling said receive signal path to ground during transmission.

4. The front-end circuit of claim 2 wherein said shunt switch comprises at least one transistor operating in a saturation mode for coupling said receive signal path to ground during transmission.

5. The front end circuit of claim 2 wherein the shunt switch comprises a single-pole, double throw switch.

6. The front-end circuit of claim 1 wherein said common signal path includes filter circuitry between the antenna and said T/R switch.

7. The front-end circuit of claim 1 wherein the receiver includes receiver electronics having an input coupled to said receive signal path, said shunt switch coupled to said receive signal path substantially proximate to said input.

8. The front-end circuit of claim 7 wherein said shunt switch is coupled to said receive signal path at an electrical distance from the input electronics of the receiver of approximately one-eighth wavelength of the radio frequency carrier signal of the radio transceiver.

9. The front-end circuit of claim 1 wherein said shunt switch is coupled to said receive path at an electrical distance from the T/R switch of approximately one-quarter wavelength of the radio frequency carrier signal of the radio transceiver.

10. The front-end circuit of claim 1 wherein the receiver includes an amplifier having an input coupled to said receive signal path, said shunt switch coupled to said receive signal path substantially proximate said amplifier.

11. The front-end circuit of claim 1 wherein said shunt switch is electronically controlled by a control signal corresponding to transmission and reception wherein said shunt switch is placed in said first shunt state during transmission and in said second shunt state during reception.

12. The front-end circuit of claim 10 wherein said control signal is derived from a transmit control signal for the radio transceiver.

13. The front-end circuit of claim 1 wherein at least a portion of the receiver is incorporated in an integrated circuit coupled to said receive signal path, said shunt switch coupled to said receive signal path substantially proximate to said integrated circuit.

14. The front-end circuit of claim 1 wherein said shunt switch and at least a portion of the receiver are incorporated in an integrated circuit.

15. The front-end circuit of claim 1 wherein said T/R switch is an electronic solid state switch.

16. The front-end circuit of claim 15 wherein said T/R switch is comprised of at least one diode being alternatively biased on and off for switching said common signal path between the transmitter and receiver.

17. The front-end circuit of claim 15 wherein said T/R switch is comprised of at least one transistor operating in a switching mode for switching said common signal path between the transmitter and receiver.

18. A radio transceiver comprising:
   a. an antenna;
   b. a receiver;
   c. a transmitter;
   d. front-end circuitry coupled between said antenna and said receiver and transmitter, said front-end circuitry further comprising:
      i. a common signal path connected to said antenna and shared by the transmitter and receiver of the radio transceiver;
      ii. a RF Transmit/Receive (T/R) switch having a first state for coupling the transmitter to the common signal path and a second state for coupling the receiver to the common signal path via a receive signal path; and
      ii. a shunt switch between said receive signal path and an electronic ground, said shunt switch distinct from said T/R switch and disposed downstream on said receive signal path from said T/R switch, said shunt switch having a first shunt state coupling said receive signal path to ground and a second shunt state not coupling said receive signal path to ground, wherein said shunt switch is placed in said first shunt state during transmission and in said second shunt state during reception.

19. The radio transceiver of claim 18 wherein said shunt switch is an electronic solid state shunt switch.

20. The radio transceiver of claim 18 wherein the receiver includes receiver electronics having an input coupled to said receive signal path, said shunt switch coupled to said receive signal path substantially proximate to said input.

21. The radio transceiver of claim 20 wherein said shunt switch is coupled to said receive signal path at an electrical distance from the input electronics of the receiver of less than about one-eighth wavelength of the radio frequency carrier signal of the radio transceiver.

22. The radio transceiver of claim 18 wherein the receiver includes an amplifier having an input coupled to said receive signal path, said shunt switch coupled to said receive signal path substantially proximate to said amplifier.

23. The radio transceiver of claim 18 wherein said shunt switch is electronically controlled by a control signal corresponding to transmission and reception wherein said switch is placed in said first state during transmission and in said second state during reception.

24. The radio transceiver of claim 18 wherein at least a portion of the receiver is incorporated in an integrated circuit coupled to said receive signal path, said shunt switch coupled to said receive signal path substantially proximate to said integrated circuit.

25. The radio transceiver of claim 18 wherein said shunt switch and at least a portion of the receiver is incorporated in an integrated circuit.

26. The radio transceiver of claim 19 wherein said T/R switch is comprised of at least one diode being alternatively biased on and off for switching said common signal path between the transmitter and receiver.

27. The radio transceiver of claim 19 wherein said T/R switch is comprised of at least one transistor operating in a switching mode for switching said common signal path between the transmitter and receiver.

28. A radio transceiver comprising an antenna; a receiver; a transmitter; and front-end circuitry coupled between said antenna and said receiver and transmitter, said front-end circuitry further comprising:

a. a common signal path shared by the transmitter and the receiver;

b. a RF Transmit/Receive (T/R) switch having a first state for coupling the transmitter to the common signal path and a second state for coupling the receiver to the common signal path via a receive signal path; and c. shunt means, located between said T/R switch and receiver, for shunting said receive signal path to an electronic ground during transmission, said shunt means distinct from said T/R switch and disposed downstream on said receive signal path from said T/R switch.

29. The radio transceiver of claim 28 wherein said shunt switch comprises:

a. a diode coupled between said receive signal path and ground, and b. a control line adapted to provide a voltage to forward bias the diode during transmission to couple an input of said receiver to ground.

30. The radio transceiver of claim 28 wherein said shunt switch comprises:

a. a transistor switching network coupled between said receive signal path and ground, and b. a control line adapted to provide a voltage to operate said network in a saturation mode during transmission to couple an input of said receiver to ground.

31. The radio transceiver of claim 28 wherein said shunt switch comprises:

a. at least one transistor coupled between said receive signal path and ground, and b. a control line adapted to provide a voltage to operate said transistor in a saturation mode during transmission to couple an input of said receiver to ground.

32. The radio transceiver of claim 28 wherein the receiver includes receiver electronics having an input coupled to said receive signal path, said shunt switch coupled to said receive signal path substantially proximate to said input.

33. The radio transceiver of claim 32 wherein said shunt switch is coupled to said receive signal path at an electrical distance from the input electronics of the receiver of within about one-eighth wavelength of the radio frequency carrier signal of the radio transceiver.

34. The mobile radio transceiver of claim 28 wherein said shunt switch is coupled to said receive path an electrical distance from the T/R switch of approximately one-quarter wavelength of a radio frequency carrier signal of the mobile terminal.

* * * * *